United States Patent
Bruno et al.

(10) Patent No.: US 10,511,385 B2
(45) Date of Patent: Dec. 17, 2019

(54) METHODS OF BI-DIRECTIONAL OPTICAL COMMUNICATION AND OPTICAL TRANSCEIVER

(71) Applicant: Telefonaktiebolaget LM Ericsson (publ), Stockholm (SE)

(72) Inventors: Gianmarco Bruno, Genoa (IT); Marco Camera, Genoa (IT); Roberto Magri, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/320,222

(22) PCT Filed: Aug. 2, 2016

(86) PCT No.: PCT/EP2016/068459
§ 371 (c)(1),
(2) Date: Jan. 24, 2019

(87) PCT Pub. No.: WO2018/024323
PCT Pub. Date: Feb. 8, 2018

(65) Prior Publication Data
US 2019/0245618 A1    Aug. 8, 2019

(51) Int. Cl.
*H04B 10/25*    (2013.01)
*H04B 10/40*    (2013.01)

(52) U.S. Cl.
CPC ......... *H04B 10/2503* (2013.01); *H04B 10/40* (2013.01)

(58) Field of Classification Search
CPC ................ H04B 10/2503; H04B 10/40
See application file for complete search history.

(56) References Cited

U.S. PATENT DOCUMENTS

| | | | |
|---|---|---|---|
| 10,063,367 B1* | 8/2018 | Aouini | H04B 10/40 |
| 2012/0134676 A1* | 5/2012 | Kikuchi | H04B 10/532 |
| | | | 398/65 |

(Continued)

FOREIGN PATENT DOCUMENTS

WO    2013000770 A1    1/2013

OTHER PUBLICATIONS

Bruno, Gianmarco, et al., "Performance of 112Gbit/s RF-assisted multi-carrier DP-16-QAM in a transparent optical domain", 2011 Optical Society of America, ECOC Technical Digest, Jul. 27, 2011, 1-3.

(Continued)

*Primary Examiner* — Mina M Shalaby
(74) *Attorney, Agent, or Firm* — Murphy, Bilak & Homiller, PLLC (57) ABSTRACT

A method (10) of bi-directional optical communication, the method comprising: generating (12) a first optical communication signal for transmission in one direction through an optical fibre, generating the first optical communication signal comprising: receiving information for transmission and generating (14) a baseband signal comprising a representation of the information; performing digital upconversion (16) of the baseband signal to form an upconverted baseband signal; performing optical modulation (18) of an optical carrier signal with the upconverted baseband signal; and restricting an optical spectrum of the first optical communication signal to a first portion of an optical channel frequency slot by performing one of digital filtering (16) in addition to digital upconversion and optical filtering (36) after optical modulation; and receiving (20) a second optical communication signal transmitted in an opposite direction through the optical fibre, the second optical communication signal having an optical spectrum occupying a second (Continued)

portion of the optical channel frequency slot, separate to the first portion.

16 Claims, 9 Drawing Sheets

(56) References Cited

U.S. PATENT DOCUMENTS

| | | | | |
|---|---|---|---|---|
| 2013/0182620 A1* | 7/2013 | Chaffee | H04B 10/11 | 370/310 |
| 2014/0016940 A1* | 1/2014 | Gottwald | H04B 10/272 | 398/79 |
| 2014/0126905 A1* | 5/2014 | Yonenaga | H04B 10/506 | 398/48 |
| 2014/0363159 A1* | 12/2014 | Chien | H04B 10/506 | 398/43 |
| 2017/0244165 A1* | 8/2017 | Ghelfi | H01Q 1/246 | |
| 2018/0145761 A1* | 5/2018 | Zhuge | H04B 10/40 | |
| 2018/0294913 A1* | 10/2018 | Chen | H04J 14/0227 | |
| 2019/0028191 A1* | 1/2019 | Xue | H04B 10/077 | |

OTHER PUBLICATIONS

Ramaswami, Rajiv, et al., "Optical Networks—A Practical Perspective", Third Edition, Sep. 25, 2009, 1-928.

* cited by examiner

METHODS OF BI-DIRECTIONAL OPTICAL COMMUNICATION AND OPTICAL TRANSCEIVER

TECHNICAL FIELD

The invention relates to a method of bi-directional optical communication. The invention further relates to an optical transceiver.

BACKGROUND

There is currently a strong effort towards the definition of the 5G mobile network requirements. Both in the fronthaul (the link between the digital unit and the radio unit) and the backhaul (the connection towards the core network) optical technologies will play a crucial role. It is commonly understood that the high bandwidth to be delivered to the end users and the related adopted technologies, for example MIMO, beamforming, and C-RAN, will require a big increase in capacity which will be likely to require much more than 10 Gbit/s per wavelength.

In the optical fronthaul/backhaul domain (and in general in the optical access) it is common to realize transmission via a single optical fibre instead of a fibre pair because the infrastructure is not owned by the telecom operator but rather by municipality, consortia or the incumbent operator. Single-fibre solutions are a de-facto requirement to halve the number of manual operations (inspection, cleaning, assembly) required by the field technician and reduce to zero the possibility of mis-connection. The requirement for single-fibre transmission means that it is not possible to adopt the current hardware used for two-fibre based 100G transmission because the transmitted and received signals would be centred at the same optical frequency and would therefore be subject to intolerable penalties due to in-band crosstalk arising from unavoidable multiple reflections.

Current solutions for single-fibre working fronthaul and backhaul solutions rely on the well-known intensity-modulated and directly-detected, IM/DD, approach. IM/DD links have been extremely successful for bit-rates up to 10 Gbit/s and are currently advantageously implemented by means of pluggable optics in the XFP or SFP+ formats. The WDM transmission bandwidth is partitioned by means of band splitters and one band is dedicated to West-East transmission and the other to East-West transmission, as described in "Optical Networks—A practical perspective", 3rd edition, Ramaswami, Sivarajan and Sasaki, 25 Sep. 2009. Direct-detection receivers are wavelength-agnostic over a wide bandwidth, so it is easy to implement the optical link as two separate lightpaths employing two different frequencies. Smaller formats are likely to be developed within the 5G timeframe, but the bit-rate of IM/DD formats is limited by the chromatic and polarization-mode dispersion of single-mode-fibre.

Another technical solution would be to integrate two separate, independently tunable lasers in the transceiver. However this solution faces two problems: higher cost, but this may be overcome by photonic integration; and power dissipation that limits the volume reduction and is a much more serious constraint.

Another straightforward solution is to use two optical fibres for each fronthaul or backhaul link but of course this is undesirable from a business perspective because it increases the operating expense.

A final solution may be to use tightly packed lower-speed optical channels based on IM/DD with interleaved or, generally, non-overlapping wavelengths. Despite the apparent simplicity, this solution would require very precise optical filters and stable lasers, the propagation would be limited by known fibre impairments and, from a business perspective, it would be a proprietary solution requiring dedicated manufacturing.

SUMMARY

It is an object to provide an improved method of bi-directional optical communication. It is a further object to provide an improved optical transceiver.

An aspect of the invention provides a method of bi-directional optical communication, the method comprising generating a first optical communication signal for transmission in one direction through an optical fibre and receiving a second optical communication signal transmitted in an opposite direction through the optical fibre. Generating the first optical communication signal comprises receiving information for transmission and generating a baseband signal comprising a representation of the information. Digital upconversion of the baseband signal is performed to form an upconverted baseband signal. Then optical modulation of an optical carrier signal with the upconverted baseband signal is performed. An optical spectrum of the first optical communication signal is restricted to a first portion of an optical channel frequency slot by performing one of digital filtering in addition to digital upconversion and optical filtering after optical modulation. The second optical communication signal has an optical spectrum occupying a second portion of the optical channel frequency slot, separate to the first portion.

The method may support high-speed single-fibre optical transmission by enabling signals traveling in the two directions to belong to the same standard frequency slot and not to overlap in frequency. The method may enable the efficient generation of an optical signal allocated to a portion of a standard frequency slot which does not interfere with a second optical signal allocated to a different portion of the same frequency slot that travels in the opposite direction. The method may ensure that transmitted and received spectra are not overlapping in frequency so there is no in-band crosstalk. Accurate upconversion and detection and sharp filtering is possible because they are performed digitally in the electrical domain, not in the optical domain. The method may enable the generation of optical communication signals for bi-directional optical communication that are compatible with the current CWDM/DWDM standardized frequency grids.

In an embodiment, the baseband signal is a real baseband signal and digital filtering is performed in addition to digital upconversion to restrict the optical spectrum of the first optical communication signal to the first portion of the optical channel frequency slot. The method may require only additional digital signal processing as compared to known dual-fibre transmission and no additional optical hardware is required.

In an embodiment, the digital filtering comprises upper-single sideband modulation. This may restrict the spectrum of the first optical communication signal to the higher-frequency portion of the electrical bandwidth.

In an embodiment, the receiving comprises: receiving an optical signal comprising the second optical communication signal and a reflected portion of the first optical communication signal; performing coherent optical demodulation of the optical signal to obtain a digital signal; performing digital filtering on the digital signal to remove a part of the digital signal representing the reflected portion of the first optical communication signal; and downconverting the filtered digital signal to obtain a baseband signal. Performing digital filtering may enable optimal filtering for the chosen modulation format or other parameters.

In an embodiment, the baseband signal is a complex baseband signal and optical filtering is performed after the optical modulation to restrict the optical spectrum of the first optical communication signal to the first portion of the optical channel frequency slot. This may provide additional flexibility and requires only additional digital signal processing and an optical filter as compared with known dual-fibre transmission. The optical filtering may be tuneable to allow for colourless flexibility or fixed.

In an embodiment, the second optical communication signal is also generated using steps a) to d) and wherein one of optical high-pass filtering and optical low-pass filtering is performed after the optical modulation for generating the first optical communication signal and the other of optical high-pass filtering and optical low-pass filtering is performed after the optical modulation for generating the second optical communication signal.

In an embodiment, the optical modulation is performed by an optical modulator having a modulation bandwidth and the baseband signal is generated to have a bandwidth that is substantially half the modulation bandwidth. This may restrict the optical spectrum of the first optical communication signal to half of the optical channel frequency slot and the second optical communication signal has an optical spectrum occupying a remaining half of the optical channel frequency.

In an embodiment, the baseband signal has a bandwidth in the range 14 GHz to 20 GHz and the optical modulator has modulation bandwidth in the range 28 GHz to 40 GHz. More preferably, the baseband signal has a bandwidth in the range 14 GHz to 16 GHz and the optical modulator has modulation bandwidth in the range 28 GHz to 32 GHz In an embodiment, the baseband signal has a higher-order modulation format, such as 4-ASK, DP-4-ASK, 8-ASK, DP-8-ASK, 16-QAM, DP-16-QAM. Using a higher modulation format may increase the spectral efficiency of the optical communication signals, which may ensure that their spectra do not overlap. It will be understood that ASK refers to amplitude shift keying, DP refers to dual-polarisation and QAM refers to quaternary amplitude modulation.

In an embodiment, the same laser is used to generate both the optical carrier signal and a local oscillator signal for use in performing the coherent optical demodulation. The method may support high-speed single-fibre optical transmission by employing single-laser digital coherent detection where the signals traveling in the two directions belong to the same standard frequency slot and do not overlap in frequency.

A further aspect of the invention provides an optical transceiver comprising a digital signal processor, DSP, a digital to analogue converter, DAC, optical signal generation apparatus and coherent optical demodulation apparatus. The DSP is configured to: receive information for transmission and generate a baseband signal comprising a representation of the information; and perform digital upconversion of the baseband signal to form an upconverted baseband signal. The DAC is configured to convert the upconverted baseband signal into a modulation signal. The optical signal generation apparatus is configured to receive the modulation signal and to modulate an optical carrier signal with the modulation signal to generate a first optical communication signal for transmission. The DSP is additionally configured to perform digital filtering in addition to digital upconversion to restrict an optical spectrum of the first optical communication signal to a first portion of an optical channel frequency slot or the optical signal generation apparatus additionally comprises an optical filter to restrict an optical spectrum of the first optical communication signal to a first portion of an optical channel frequency slot. The coherent optical demodulation apparatus is configured to receive a second optical communication signal and configured to perform coherent detection of the second optical communication signal, wherein the second optical communication signal has an optical spectrum occupying a second portion of the optical channel frequency slot, separate to the first portion.

The transceiver may support high-speed single-fibre bi-directional optical communication by enabling the signals traveling in the two directions to belong to the same standard frequency slot and not to overlap in frequency. The transceiver may enable the efficient generation of an optical signal allocated to a portion of a standard frequency slot which does not interfere with a second optical signal allocated to a different portion of the same frequency slot that travels in the opposite direction. The transceiver may ensure that transmitted and received spectra are not overlapping in frequency so there is no in-band crosstalk. Accurate upconversion and detection and sharp filtering is possible because they are performed digitally in the electrical domain, not in the optical domain. The transceiver may enable the generation of optical communication signals for bi-directional optical communication that are compatible with the current CWDM/DWDM standardized frequency grids. The transceiver may be backward compatible with dual-fibre working pluggable transceiver modules, unlike transceivers based on direct detection.

In an embodiment, the baseband signal is a real baseband signal and the DSP is configured to perform digital filtering in addition to digital upconversion to restrict the optical spectrum of the first optical communication signal to the first portion of the optical channel frequency slot. The transceiver may require only additional digital signal processing as compared to known transceivers for dual-fibre transmission and no additional optical hardware is required.

In an embodiment, digital filtering comprises upper-single sideband modulation. This may restrict the spectrum of the first optical communication signal to the higher-frequency portion of the electrical bandwidth.

In an embodiment, the coherent optical demodulation apparatus is configured to receive an optical signal comprising the second optical communication signal and a reflected portion of the first optical communication signal. The coherent optical demodulation apparatus is additionally configured to perform coherent detection of the received optical signal to obtain a digital signal. The DSP is additionally configured to: perform digital filtering on the digital signal to remove a part of the digital signal representing the reflected portion of the first optical communication signal; and downconvert the filtered digital signal to obtain a real baseband signal. Performing digital filtering may enable optimal filtering for the chosen modulation format or other parameters.

In an embodiment, the baseband signal is a complex baseband signal and the optical transceiver further comprises an optical filter configured to filter the optical carrier signal after modulation with the modulation signal. This may provide additional flexibility and the transceiver requires only additional digital signal processing and an optical filter as compared to known transceivers for dual-fibre transmission. The optical filter may be tuneable to allow for colourless flexibility or fixed.

In an embodiment, the optical transceiver comprises a laser configured to generate an optical signal used to provide both the optical carrier signal and a local oscillator signal of the coherent optical demodulation apparatus. The transceiver may support high-speed single-fibre bi-directional optical communication by employing single-laser digital coherent detection where the signals traveling in the two directions belong to the same standard frequency slot and do not overlap in frequency.

In an embodiment, the optical signal generation apparatus comprises an optical modulator configured to modulate the optical carrier signal with the modulation signal. The optical modulator is configured to operate at a modulation frequency and the baseband signal has a bandwidth that is substantially half the modulation frequency. This may restrict the optical spectrum of the first optical communication signal to half of the optical channel frequency slot and the second optical communication signal has an optical spectrum occupying a remaining half of the optical channel frequency.

In an embodiment, the baseband signal has a bandwidth in the range 14 GHz to 20 GHz and the optical modulator has modulation bandwidth in the range 28 GHz to 40 GHz. More preferably, the baseband signal has a bandwidth in the range 14 GHz to 16 GHz and the optical modulator has modulation bandwidth in the range 28 GHz to 32 GHz In an embodiment, the baseband signal has a higher-order modulation format, such as 4-ASK, DP-4-ASK, 8-ASK, DP-8-ASK, 16-QAM, DP-16-QAM. Using a higher modulation format may increase the spectral efficiency of the optical communication signals, which may ensure that their spectra do not overlap.

A further aspect of the invention provides an optical transceiver comprising:

a digital signal processor configured to receive information for transmission, the digital signal processor comprising a generation module for generating a baseband signal comprising a representation of the information and an upconversion module for performing digital upconversion of the baseband signal to form an upconverted baseband signal;

a digital to analogue converter configured to convert the upconverted baseband signal into a modulation signal;

optical signal generation apparatus configured to receive the modulation signal and to modulate an optical carrier signal with the modulation signal to generate a first optical communication signal for transmission, wherein the digital signal processor additionally comprises a filtering module for performing digital filtering in addition to digital upconversion to restrict an optical spectrum of the first optical communication signal to a first portion of an optical channel frequency slot or the optical signal generation apparatus additionally comprises an optical filter to restrict an optical spectrum of the first optical communication signal to a first portion of an optical channel frequency slot; and coherent optical demodulation apparatus configured to receive a second optical communication signal and configured to perform coherent detection of the second optical communication signal, wherein the second optical communication signal has an optical spectrum occupying a second portion of the optical channel frequency slot, separate to the first portion.

Embodiments of the invention will now be described, by way of example only, with reference to the accompanying drawings.

DETAILED DESCRIPTION

The same reference numbers will used for corresponding features in different embodiments.

Figure 1:
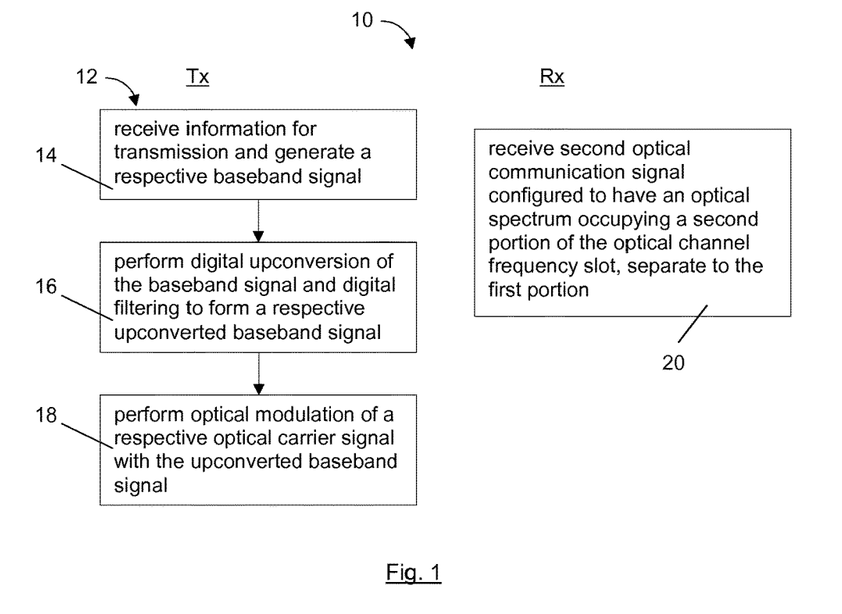
FIGS. 1 to 3 show the steps of methods according to embodiments of the invention of bi-directional optical communication.

An embodiment of the invention provides a method 10 of bi-directional optical communication, as illustrated in FIG. 1.

The method comprises generating 12 a first optical communication signal for transmission in one direction through an optical fibre and receiving 20 a second optical communication signal transmitted in an opposite direction through the optical fibre.

Generating the first optical communication signal comprises receiving information for transmission and generating 14 a respective baseband signal comprising a representation of the information. Digital upconversion 16 of the baseband signal is then performed to form a respective upconverted baseband signal and digital filtering 16 is performed to restrict an optical spectrum of the first optical communication signal to a first portion of an optical channel frequency slot. Optical modulation 18 of a respective optical carrier signal with the upconverted and digitally filtered baseband signal is performed.

The second optical communication signal has an optical spectrum occupying a second portion of the optical channel frequency slot, separate to the first portion.

An optical channel frequency slot is the frequency range allocated to a slot, and unavailable to other slots, in a WDM frequency grid, i.e. the grid of frequencies allocated to the various optical channels in a WDM system. A frequency slot is defined by its nominal central frequency and its width; see for example ITU-T Recommendation G.694.1 "Spectral grids for WDM applications: DWDM frequency grid".

A baseband signal will be understood to mean the original signal, carrying the information for transmission, including any overhead, generated by an information source. For example, the baseband signal may comprise a client signal wrapped into an optical transport unit, OTU, frame, such as OTU4, and then forward error correction, FEC, coded, with training sequences.

It will be understood that the baseband signal is in the electrical domain and will be upconverted into an optical signal as a result of optical modulation.

Figure 2:
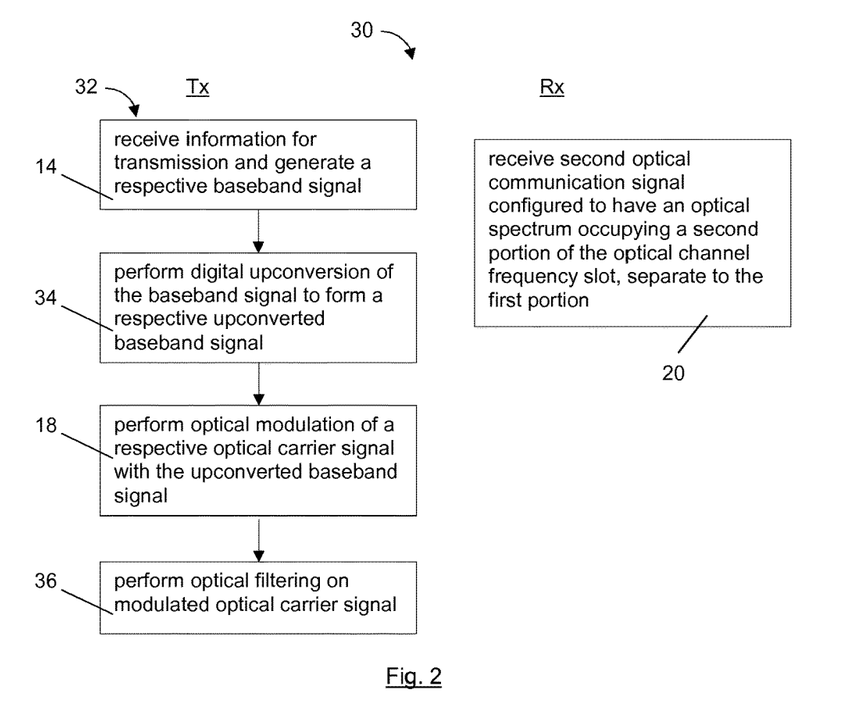

Another embodiment, illustrated in FIG. 2, provides a method 30 of bi-directional optical communication which is similar to the method 10 of FIG. 1. In this embodiment, digital upconversion 34 of the baseband signal is performed to form a respective upconverted baseband signal, without any digital filtering. The optical spectrum of the first optical communication signal is instead restricted to a first portion of an optical channel frequency slot by performing optical filtering 36 after optical modulation.

Figure 3:
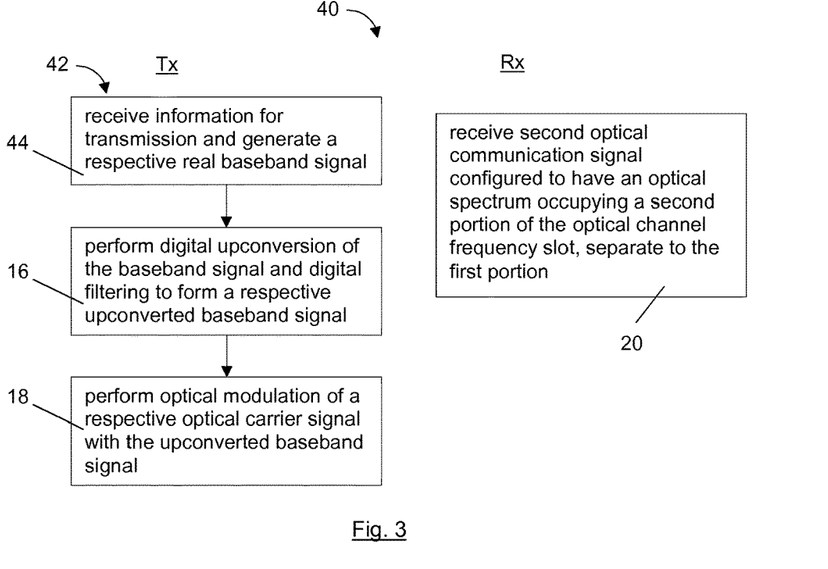

FIG. 3 illustrates a method 30 of bi-directional optical communication according to an embodiment of the invention, which is similar to the method 10 of FIG. 1. In this embodiment, the baseband signal is a real baseband signal, that is to say a baseband signal having only real components.

A method of bi-directional optical communication according to a further embodiment of the invention, substantially the same as the method 30 of FIG. 3, is illustrated in FIGS. 4 to 7. In this embodiment, the digital filtering comprises upper-single sideband, SSB, modulation.

In this example, the method is applied to implement bi-directional optical communication in an optical channel frequency slot of a single-fibre optical link; the frequency slot is a standard 50 GHz frequency slot. The symbol rate for such an arrangement is typically 28-32 GBaud and enables single-wavelength transmission of 100 DP-QPSK. The method 30 uses real baseband signals only and requires only extra digital signal processing, DSP, to implement the digital filtering.

Figure 4:
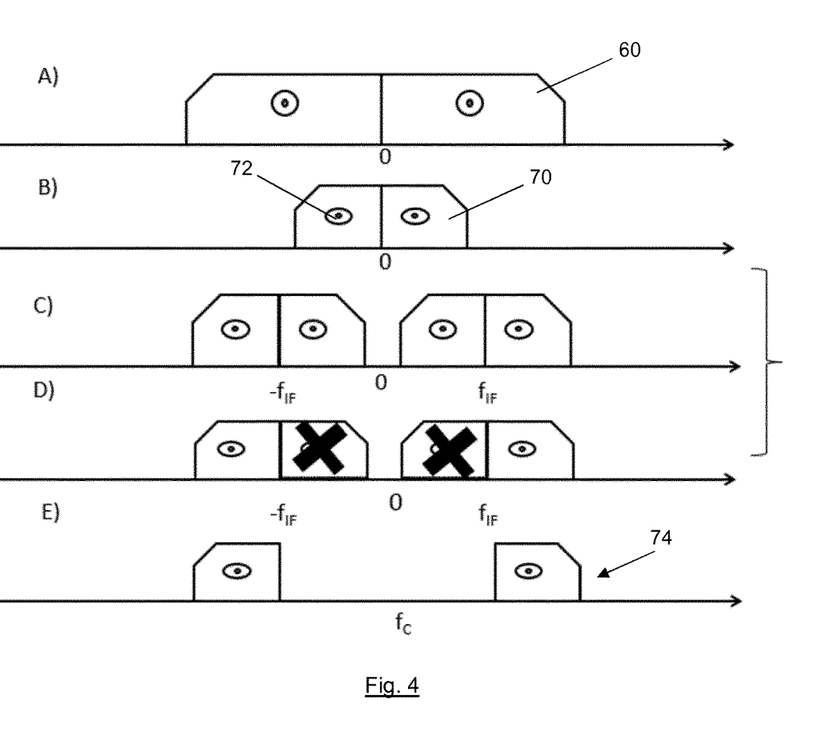
FIGS. 4 to 6 illustrate generation of optical communication signals for bi-directional optical communication, according to an embodiment of the invention.
Figure 7:
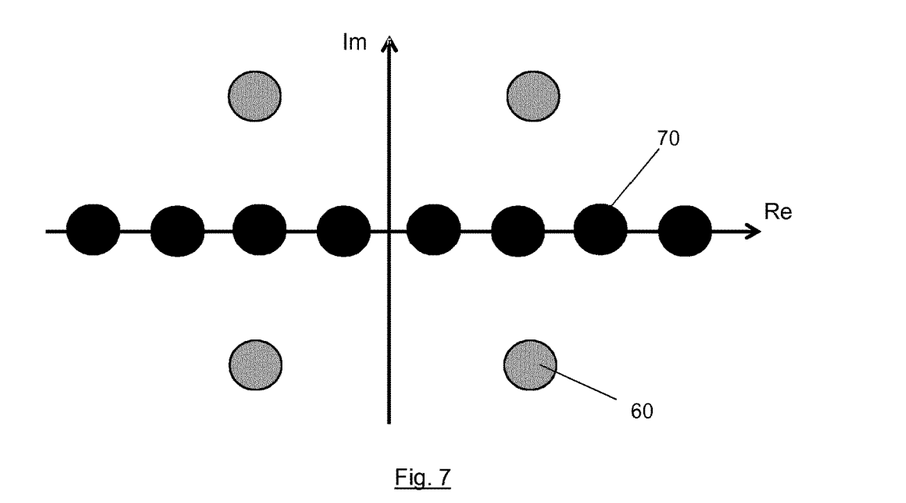
FIG. 7 shows constellation diagrams for 4-QAM modulation format (grey circles) and for an 8-ASK modulation format for use in the method illustrated by FIGS. 4 to 6.

FIG. 4A) and the constellation diagram 60 in FIG. 7 illustrate a QPSK (4-QAM) baseband signal, as would normally be used for single-wavelength transmission at a 28-34.5 GBaud symbol rate. The arrow-head symbol 72 indicates the sense of transmission of the optical signal in the fibre.

FIG. 4B) and the constellation diagram 70 in FIG. 7 illustrate an 8-ASK real baseband signal generated using the method 30. It can be seen that using a higher-order modulation format results in the required bandwidth being halved. Higher-order modulation will be understood to mean a digital modulation format with an order of 4 or higher, such that it encodes at least 2 bits per symbol.

Using 8-ASK modulation format instead of QPSK modulation format halves the bandwidth of the baseband signal but results in the bit rate being reduced to 75% of the bit rate available using QPSK. Alternatively, the same order modulation format may be used for the baseband signal, i.e. 4-ASK, which would reduce the bit rate by 50%.

In order to maintain the bit rate as compared to QPSK, 16-ASK modulation format must be used. In general terms, using the method of the present invention, changing from using M-QAM (M-PSK) modulation format, as in the known dual-fibre bi-directional transmission systems, to using N-ASK will halve the required bandwidth of the baseband signal and: if N=4×M the bit rate will remain the same; if N=2×M the bit rate will be reduced by 25%; and if N=M the bit rate will be reduced by 50%.

The optical modulation is performed by an optical modulator having an operating frequency and the bandwidth of the baseband signal is substantially half the operating frequency of the optical modulator.

FIG. 4C) illustrates the upconverted baseband signal, following digital upconversion of the real baseband signal. The process of upconversion takes the baseband signal and shifts is frequency spectrum up to a carrier frequency, $f_{IF}$. In a baseband signal, the negative frequency components overlie the positive frequency components. When the baseband signal is upconverted, the positive and negative components are "unfolded", with the negative components below the carrier frequency and the positive components above the carrier frequency.

FIG. 4D) illustrates the upconverted signal after digital filtering, i.e. after upper-SSB modulation. The resulting signal occupies the higher-frequency portion of the electrical bandwidth. The upper-SSB upconversion is performed in the digital domain by DSP.

As indicated by the parentheses in FIG. 4, the digital upconversion and digital upper-SSB modulation are performed together.

FIG. 4E) shows the resulting first optical communication signal 74, generated by upconversion at the optical frequency $f_C$ of the RF-SSB signal generated at the previous step i.e. after optical modulation. The optical frequency range in between is available for transmission in the opposite sense.

Figure 5:
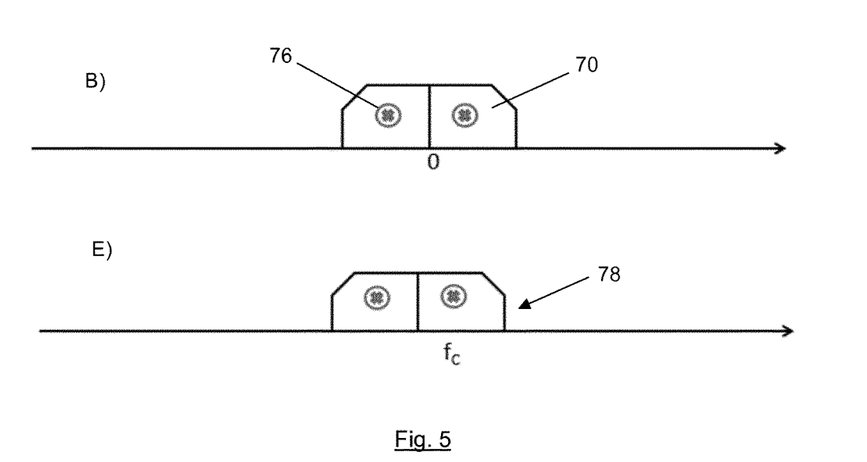

FIG. 5 illustrates generation of the second optical communication signal 78, for transmission in the opposite sense 76 (indicated by the arrow tails). The second optical communication signal is simply generated from an 8-ASK real baseband signal 70, as illustrated in FIG. 5B), which is used to perform optical modulation of a further optical carrier signal, having the same optical frequency $f_C$ as for the first optical communication signal, to form the second optical communication signal shown in FIG. 5E). The same letters are used to label FIG. 5 as are used in FIG. 4 to indicate equivalent signals.

As can be seen from FIGS. 4 and 5, both the first and second baseband signals are contained within the bandwidth of the currently used, QPSK baseband signal.

Figure 6:
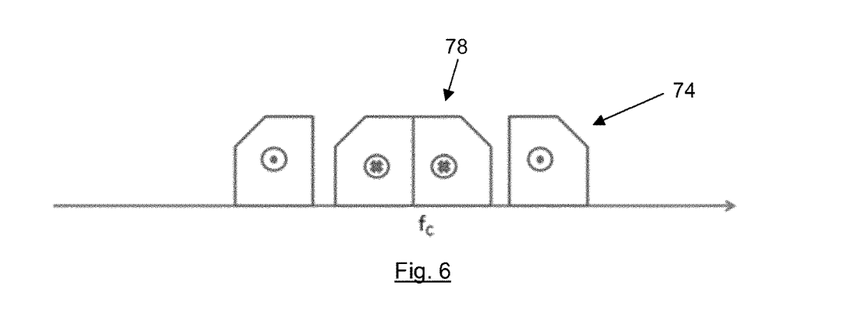

FIG. 6 illustrates both the first optical communication signal 74 and the second optical communication signal 78 within the optical channel frequency slot. As can be seen, the first optical communication signal occupies a first portion of the optical channel frequency slot and the second optical communication signal occupies a second portion of the optical channel frequency slot. The optical spectra of the first and second optical communications signals therefore do not overlap, therefore avoiding in-band crosstalk between them.

Figure 8:
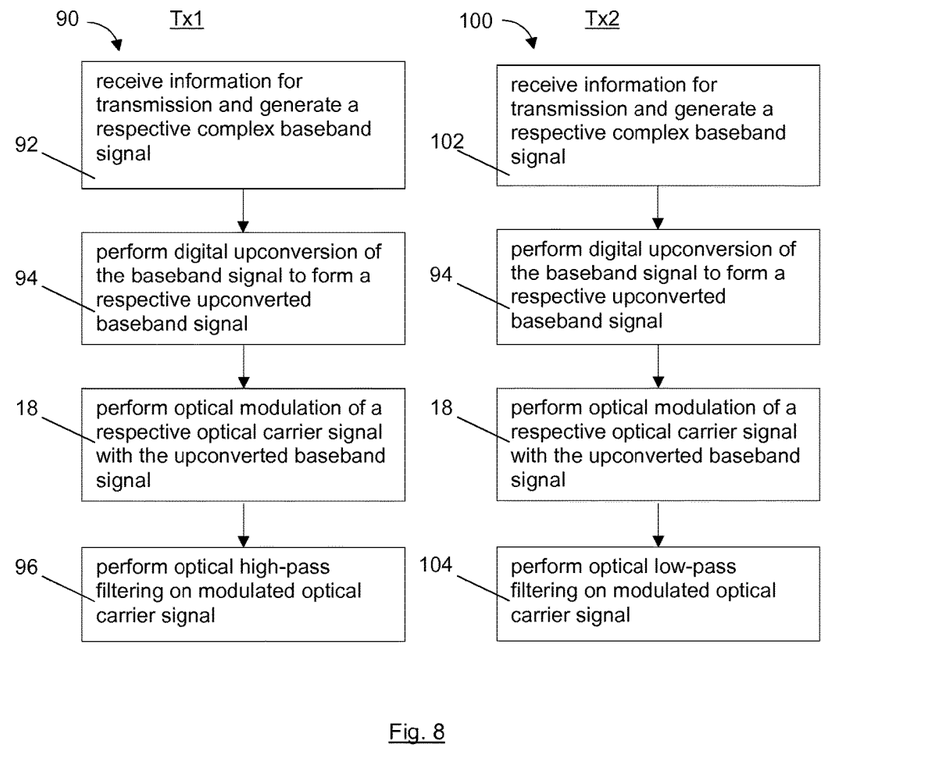
FIG. 8 shows the steps of a method according to an embodiment of the invention of bi-directional optical communication.

FIG. 8 illustrates a method 90, 100 of bi-directional optical communication. The method comprises generating 90 a first optical communication signal for transmission in one direction through an optical fibre and receiving a second optical communication signal transmitted in an opposite direction through the optical fibre.

Generating 90 the first optical communication signal comprises receiving information for transmission and generating 92 a respective complex baseband signal comprising a representation of the information. Digital upconversion 94 of the complex baseband signal is then performed to form a respective upconverted baseband signal. Optical modulation 18 of a respective optical carrier signal with the upconverted and digitally filtered baseband signal is performed. Optical high-pass filtering 96 is then performed on the modulated optical carrier signal to restrict the optical spectrum of the first optical communication signal to the first portion of the optical channel frequency slot.

The second optical communication signal has an optical spectrum occupying a second portion of the optical channel frequency slot, separate to the first portion.

The second optical communication signal is generated 102 by receiving information for transmission and generating 102 a respective complex baseband signal comprising a representation of the information. Digital upconversion 94 of the complex baseband signal is then performed to form a respective upconverted baseband signal. Optical modulation 18 of a respective optical carrier signal with the upconverted and digitally filtered baseband signal is performed. Optical low-pass filtering 104 is then performed on the modulated optical carrier signal to restrict the optical spectrum of the second optical communication signal to the second portion of the optical channel frequency slot.

Figure 9:
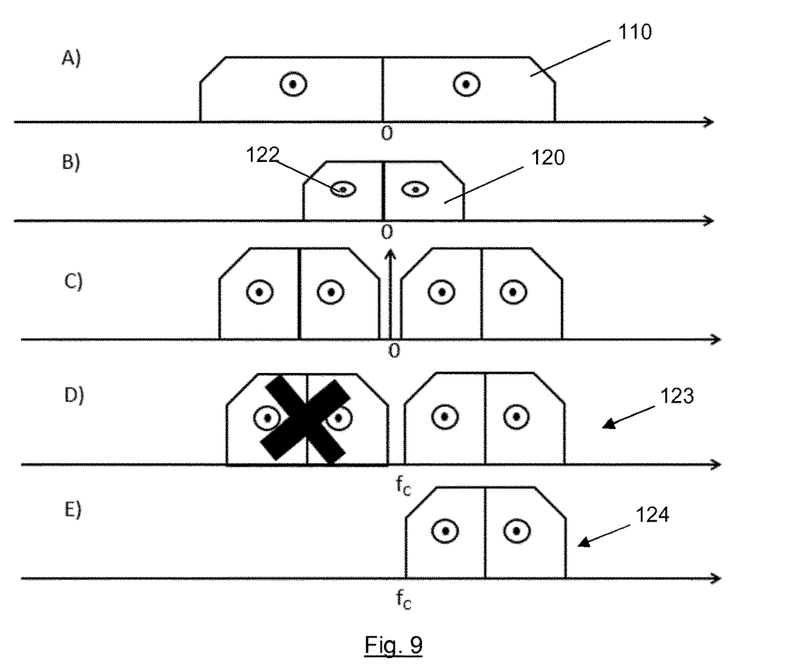
FIGS. 9 to 11 illustrate generation of optical communication signals for bi-directional optical communication, according to an embodiment of the invention.
Figure 12:
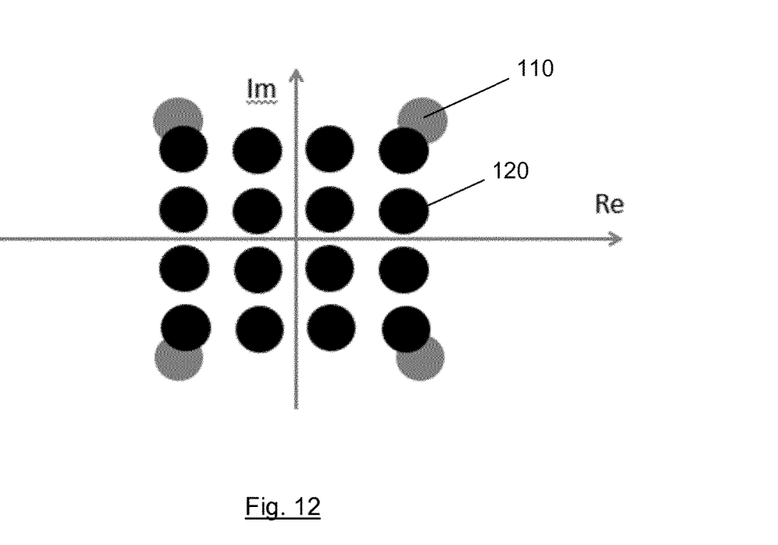
FIG. 12 shows constellation diagrams for a 4-QAM modulation format (grey circles) and for a 16-QAM modulation format for use in the method illustrated by FIGS. 9 to 11.

FIG. 9A) and the constellation diagram 110 in FIG. 12 illustrate a QPSK (4-QAM) baseband signal, as would normally be used for single-wavelength transmission at a 28-34.5 GBaud symbol rate. The arrow-head symbol 122 indicates the sense of transmission of the optical signal in the fibre.

FIG. 9B) and the constellation diagram 120 in FIG. 12 illustrate a 16-QAM real baseband signal generated using the method 90. It can again be seen that using a higher-order modulation format results in the required bandwidth being halved.

In general terms, using the method of the present invention, changing from using M-QAM modulation format, as in the known dual-fibre bi-directional transmission systems, to using N-QAM will halve the required bandwidth of the baseband signal and: if N=4×M the bit rate will remain the same; if N=2×M the bit rate will be reduced by 25%; and if N=M the bit rate will be reduced by 50%.

The optical modulation is performed by an optical modulator having an operating frequency and the bandwidth of the baseband signal is substantially half the operating frequency of the optical modulator.

FIG. 9C) illustrates the upconverted baseband signal, following digital upconversion of the complex baseband signal. The process of upconversion takes the baseband signal and shifts is frequency spectrum up to a carrier frequency, $f_{IF}$. In a baseband signal, the negative frequency components overlie the positive frequency components. When the baseband signal is upconverted, the positive and negative components are "unfolded", with the negative components below the carrier frequency and the positive components above the carrier frequency.

FIG. 9D) illustrates an optical communication signal 123 generated by performing optical modulation of an optical carrier signal with the upconverted baseband signal.

FIG. 9E) shows the resulting first optical communication signal 124, produced by optical high-pass filtering the optical communication signal 123.

Figure 10:
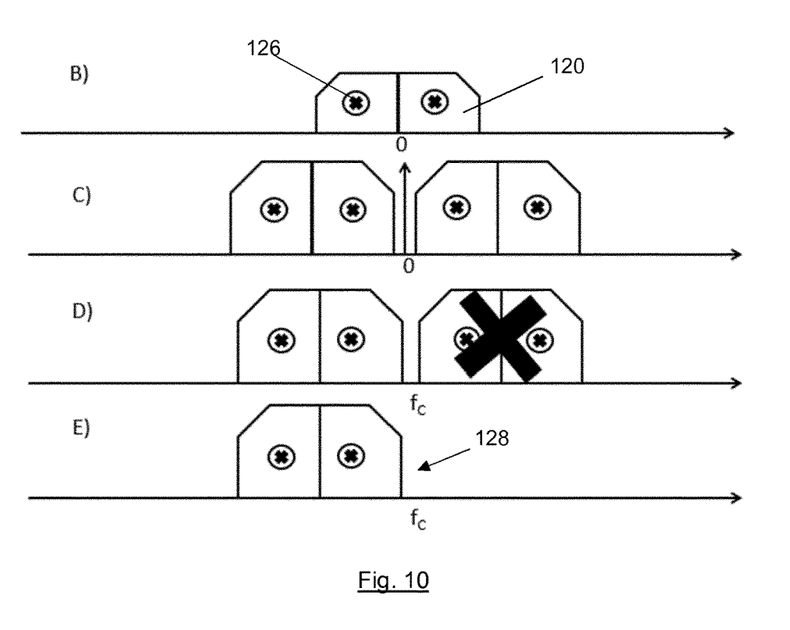

FIG. 10 similarly illustrates generation of the second optical communication signal 128, for transmission in the opposite sense 126 (indicated by the arrow tails). The second optical communication signal is generated using the same method as for generating the first optical communication signal but uses optical low-pass filtering, as illustrated in FIG. 10D).

As can be seen from FIGS. 9 and 10, both the first and second baseband signals are contained within the bandwidth of the currently used, QPSK baseband signal.

Figure 11:
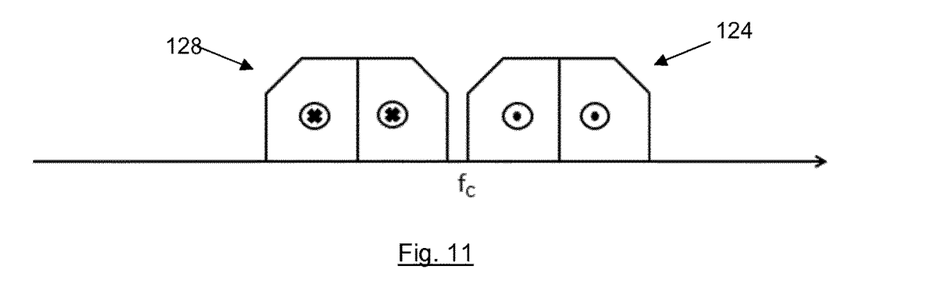

FIG. 11 illustrates both the first optical communication signal 124 and the second optical communication signal 128 within the optical channel frequency slot. As can be seen, the first optical communication signal occupies a first portion of the optical channel frequency slot and the second optical communication signal occupies a second portion of the optical channel frequency slot. The optical spectra of the first and second optical communications signals therefore do not overlap, therefore avoiding in-band crosstalk between them.

Figure 13:
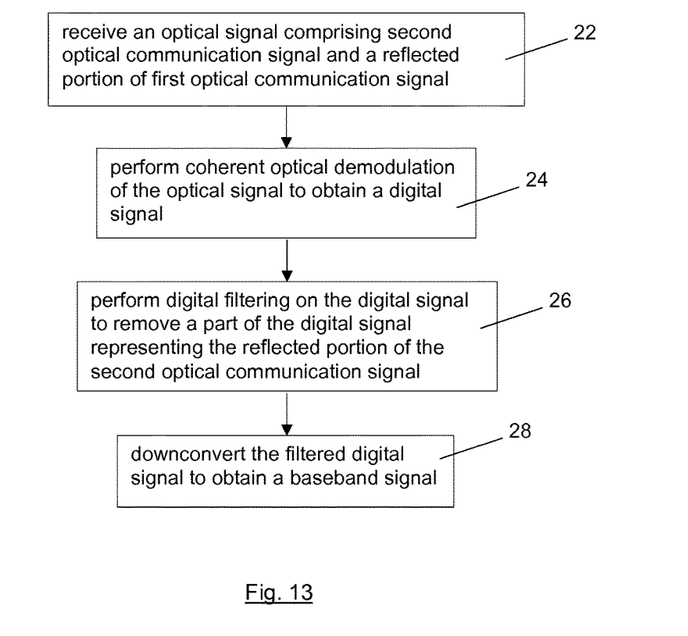
FIG. 13 shows steps of receiving the second optical communication signal.

FIG. 13 illustrates receiving 20 a second optical communication signal as part of a method according to a further embodiment of bi-directional optical communication. The first optical signal is generated according to the method described in any of the previous embodiments relating to a real baseband signal.

In this embodiment, receiving 20 the second optical signal comprises receiving 22 an optical signal comprising the second optical communication signal and a reflected portion of the first optical communication signal. Coherent optical demodulation 24 of the optical signal is then performed to obtain a digital signal. The digital signal is digitally filtered 26 to remove a part of the digital signal representing the reflected portion of the first optical communication signal. The filtered digital signal is then downconverted 28 to obtain a baseband signal.

Figure 14:
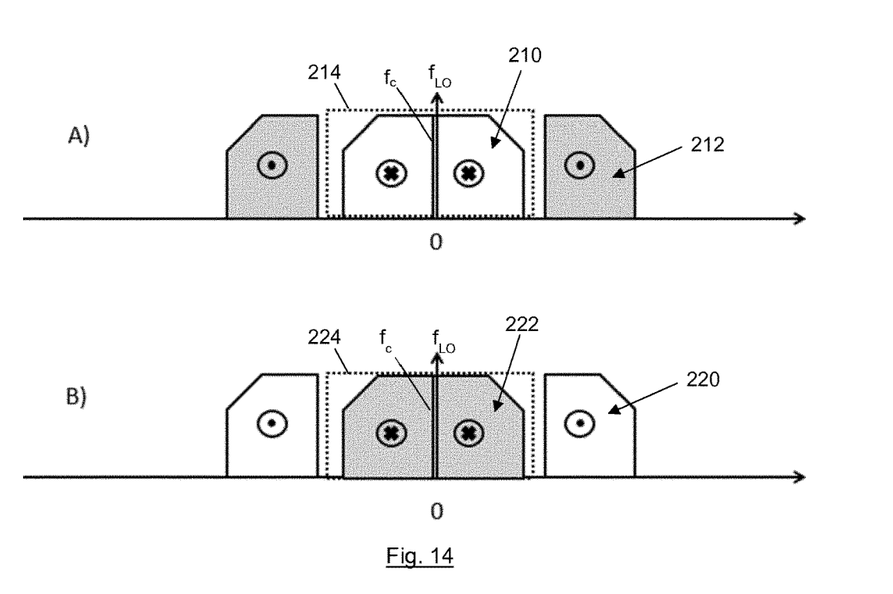
FIG. 14 illustrates A) low-pass digital filtering and B) high-pass digital filtering of a digital signal received in a method according to an embodiment of the invention of bi-directional optical communication.

As illustrated in FIG. 14 A), if the second optical communication signal 210 occupies the inner part of the frequency range, the digital signal is filtered with a digital lowpass filter 214 to reject any reflected power of the first optical communication signal 212.

As illustrated in FIG. 14 B), if the second optical communication signal 220 occupies the outer part of the frequency range, the digital signal is filtered with a digital highpass filter 224 to reject any reflected power of the first optical communication signal 222.

FIGS. 14 A) and B) both show a slight offset between the frequency of the optical carrier signal, $f_c$, and the frequency of the local oscillator, $f_{LO}$, used in the coherent optical demodulation 24. This difference may be corrected for digitally by the DSP.

Figure 15:
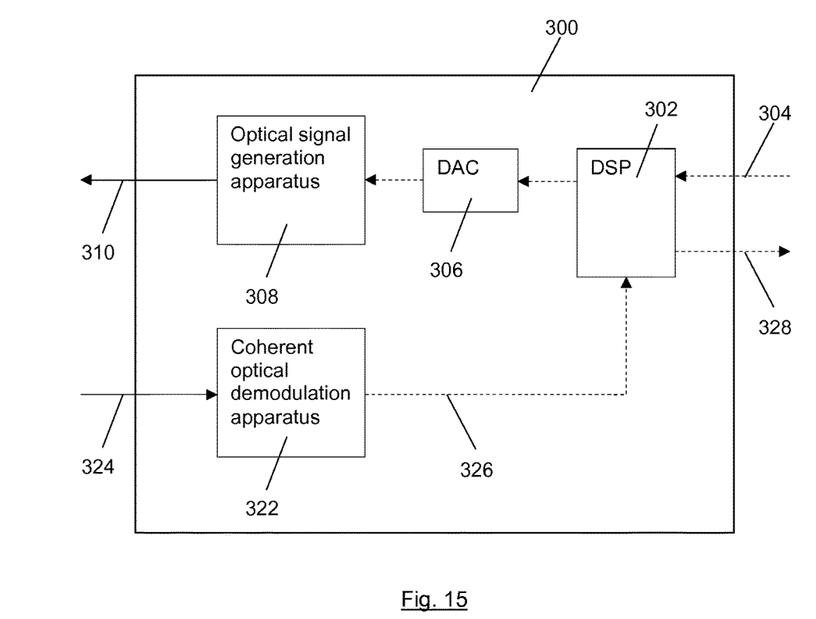
FIGS. 15 to 18 are schematic representations of optical transceivers according to embodiments of the invention.

An embodiment of the invention provides an optical transceiver 300 as illustrated in FIG. 15. The optical transceiver 300 comprises a digital signal processor, DSP, 302, a digital to analogue converter, DAC, 306, optical signal generation apparatus 308 and coherent optical demodulation apparatus 322.

The DSP 302 is configured to receive information 304 for transmission and to generate a real baseband signal comprising a representation of the information. The DSP is also configured to perform digital upconversion of the real baseband signal to form an upconverted baseband signal. The DAC 306 is configured to convert the upconverted baseband signal into a modulation signal. The optical signal generation apparatus 308 is configured to receive the modulation signal and to modulate an optical carrier signal with the modulation signal to generate a first optical communication signal 310 for transmission. The DSP is additionally configured to perform digital filtering in addition to digital upconversion to restrict an optical spectrum of the first optical communication signal to a first portion of an optical channel frequency slot. The coherent optical demodulation apparatus 322 is configured to receive a second optical communication signal 324 and is configured to perform coherent detection of the second optical communication signal. The second optical communication signal has an optical spectrum occupying a second portion of the optical channel frequency slot, separate to the first portion.

In an embodiment, the real baseband signal has a higher-order modulation format.

In an embodiment, the digital filtering comprises upper-SSB.

In an embodiment, the coherent optical demodulation apparatus 322 is configured to receive an optical signal comprising the second optical communication signal 324 and a reflected portion of the first optical communication signal 310. The coherent optical demodulation apparatus is configured to perform coherent detection of the received optical signal to obtain a digital signal 326.

The DSP 302 in this embodiment is additionally configured to perform digital filtering on the digital signal to remove a part of the digital signal representing the reflected portion of the first optical communication signal. The DSP is also configured to downconvert the filtered digital signal to obtain a real baseband signal 328.

The optical transceiver 300 may be configured to implement the method 30 of bi-directional communication described above with reference to FIGS. 3 to 7.

Figure 16:
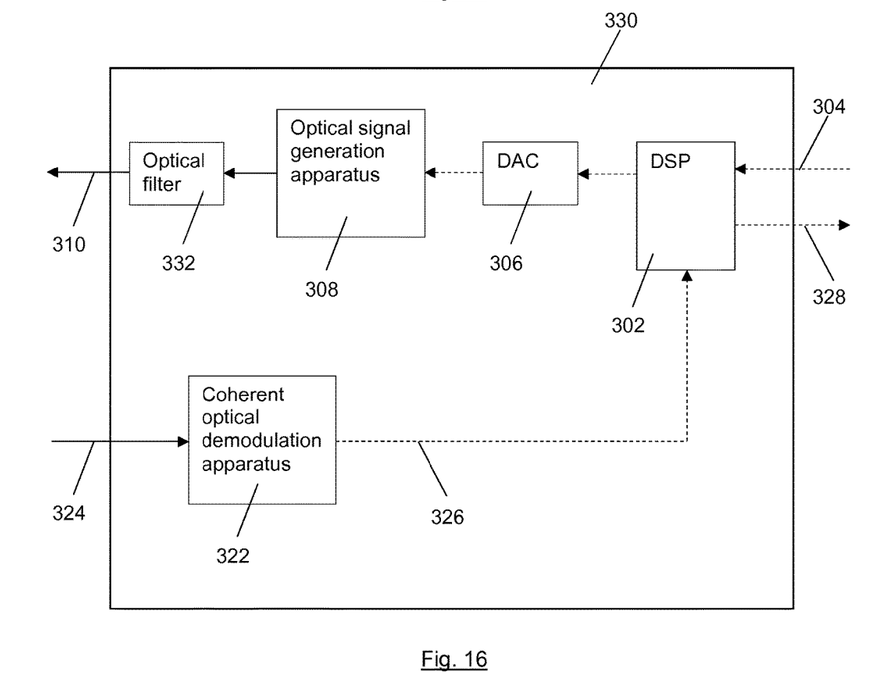

An embodiment of the invention provides an optical transceiver 330 as illustrated in FIG. 16. The optical transceiver 330 comprises a digital signal processor, DSP, 302, a digital to analogue converter, DAC, 306, optical signal generation apparatus 308, an optical filter 332 and coherent optical demodulation apparatus 322.

The DSP 302 is configured to receive information 304 for transmission and to generate a complex baseband signal comprising a representation of the information. The DSP is also configured to perform digital upconversion of the complex baseband signal to form an upconverted baseband signal. The DAC 306 is configured to convert the upconverted baseband signal into a modulation signal. The optical signal generation apparatus 308 is configured to receive the modulation signal and to modulate an optical carrier signal with the modulation signal to generate a first optical communication signal 310 for transmission.

The optical filter 332 is configured to restrict an optical spectrum of the first optical communication signal to a first portion of an optical channel frequency slot.

The coherent optical demodulation apparatus 322 is configured to receive a second optical communication signal 324 and is configured to perform coherent detection of the second optical communication signal. The second optical communication signal has an optical spectrum occupying a second portion of the optical channel frequency slot, separate to the first portion.

In an embodiment, the complex baseband signal has a higher-order modulation format.

In an embodiment, the coherent optical demodulation apparatus is configured to perform detection of the second optical communication signal according to the method of detection of DP-16-QAM signals employing RF upconversion, optical modulation and SSB via optical filtering reported in G. Bruno et al, "Performance of 112 Gbit/s RF-assisted multi-carrier DP-16-QAM in a transparent optical domain", European Conference on Optical Communication 2011, Technical Digest, Th.11.A.2.pdf.

The optical transceiver 330 may be configured to implement the method 90, 100 of bi-directional communication described above with reference to FIGS. 8 to 11.

Figure 17:
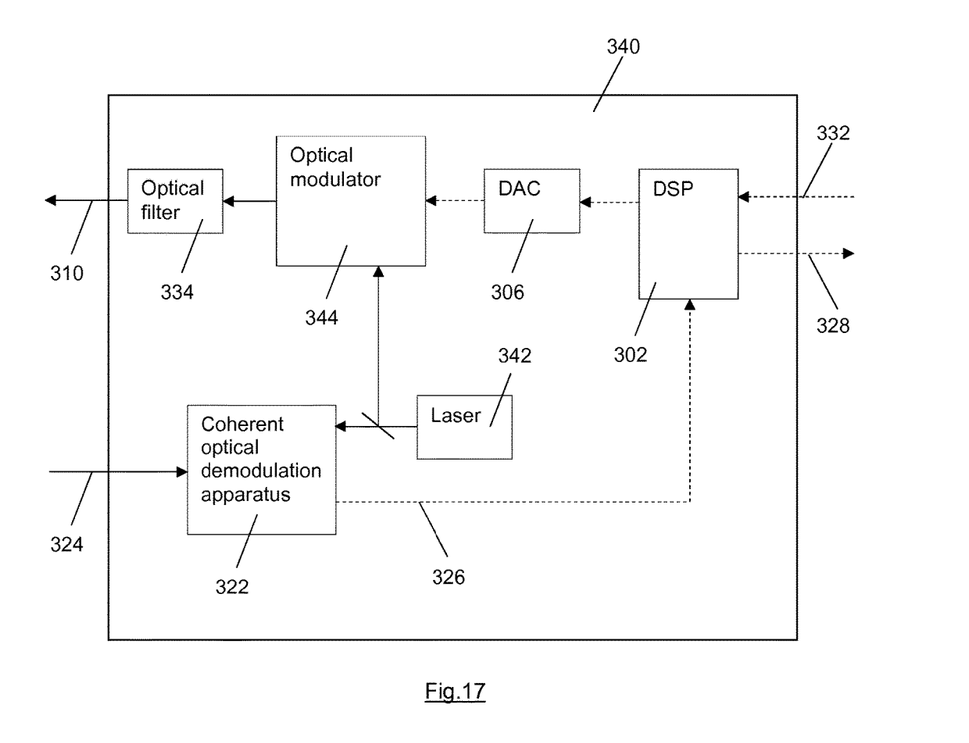

A further embodiment of the invention provides an optical transceiver 340 as illustrated in FIG. 17. The optical transceiver 340 is similar to the optical transceiver 300 of FIG. 15, with the following modifications.

In this embodiment, the optical signal generation apparatus comprises an optical modulator 344 configured to modulate the optical carrier signal with the modulation signal. The optical modulator is configured to operate at a modulation frequency and the baseband signal has a bandwidth that is substantially half the modulation frequency. The baseband signal has a higher-order modulation format.

The optical transceiver 340 additionally comprises a laser 342 configured to generate an optical signal used to provide both the optical carrier signal and a local oscillator signal for the coherent optical demodulation apparatus 322.

Figure 18:
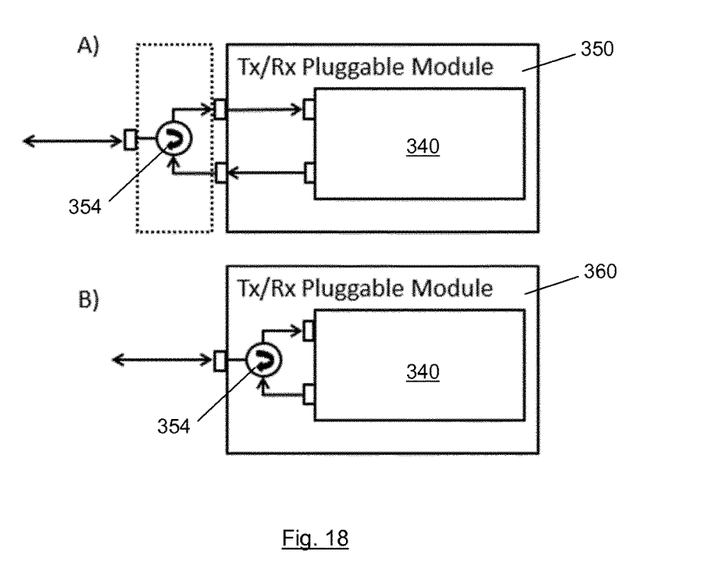

FIG. 18 A) illustrates the transceiver 340 of FIG. 17 implemented as a pluggable module 350 having an external circulator 354 to couple the optical filter 310 and the coherent optical demodulation apparatus 322 to a single optical fibre.

FIG. 18 B) illustrates the transceiver 340 of FIG. 17 implemented as a pluggable module 360 having an internal circulator 354 to couple the optical filter 310 and the coherent optical demodulation apparatus 322 to a single optical fibre.

The invention claimed is:

1. A method of bi-directional optical communication, the method comprising:
generating a first optical communication signal for transmission in one direction through an optical fiber, wherein generating the first optical communication signal comprises:
receiving information for transmission and generating a baseband signal comprising a representation of the information;
performing digital upconversion of the baseband signal to form an upconverted baseband signal;
performing optical modulation of an optical carrier signal with the upconverted baseband signal; and
restricting an optical spectrum of the first optical communication signal to a first portion of an optical channel frequency slot by performing one of digital filtering in addition to digital upconversion and optical filtering after optical modulation;
and receiving a second optical communication signal transmitted in an opposite direction through the optical fiber, the second optical communication signal having an optical spectrum occupying a second portion of the optical channel frequency slot, separate to the first portion.

2. The method of claim 1, wherein the baseband signal is a real baseband signal and digital filtering is performed in addition to digital upconversion to restrict the optical spectrum of the first optical communication signal to the first portion of the optical channel frequency slot.

3. The method of claim 2, wherein the digital filtering comprises upper-single sideband modulation.

4. The method of claim 1, wherein the baseband signal is a complex baseband signal and optical filtering is performed after the optical modulation to restrict the optical spectrum of the first optical communication signal to the first portion of the optical channel frequency slot.

5. The method of claim 4, wherein the second optical communication signal is generated using the same method as for generating the first optical communication signal and wherein one of optical high-pass filtering and optical low-pass filtering is performed after the optical modulation for generating the first optical communication signal and the other of optical high-pass filtering and optical low-pass filtering is performed after the optical modulation for generating the second optical communication signal.

6. The method of claim 1, wherein the optical modulation is performed by an optical modulator having an operating frequency and the baseband signal has a bandwidth that is substantially half the operating frequency of the optical modulator.

7. The method of claim 6, wherein the baseband signal has a higher-order modulation format.

8. The method of claim 1, wherein the receiving comprises receiving an optical signal comprising the second optical communication signal and a reflected portion of the first optical communication signal;
performing coherent optical demodulation of the optical signal to obtain a digital signal;
performing digital filtering on the digital signal to remove a part of the digital signal representing the reflected portion of the first optical communication signal; and
downconverting the filtered digital signal to obtain a baseband signal.

9. An optical transceiver comprising:
a digital signal processor configured to:
receive information for transmission and generate a baseband signal comprising a representation of the information, and perform digital upconversion of the baseband signal to form an upconverted baseband signal;
a digital to analogue converter configured to convert the upconverted baseband signal into a modulation signal;
optical signal generation apparatus configured to receive the modulation signal and to modulate an optical carrier signal with the modulation signal to generate a first optical communication signal for transmission,
wherein the digital signal processor is additionally configured to perform digital filtering in addition to digital upconversion to restrict an optical spectrum of the first optical communication signal to a first portion of an optical channel frequency slot or the optical signal generation apparatus additionally comprises an optical filter to restrict an optical spectrum of the first optical communication signal to a first portion of an optical channel frequency slot; and
coherent optical demodulation apparatus configured to receive a second optical communication signal and configured to perform coherent detection of the second optical communication signal, wherein the second optical communication signal has an optical spectrum occupying a second portion of the optical channel frequency slot, separate to the first portion.

10. The optical transceiver of claim 9, wherein the baseband signal is a real baseband signal and the digital signal processor is configured to perform digital filtering in addition to digital upconversion to restrict the optical spectrum of the first optical communication signal to the first portion of the optical channel frequency slot.

11. The optical transceiver of claim 10, wherein digital filtering comprises upper-single sideband modulation.

12. The optical transceiver of claim 9, wherein the coherent optical demodulation apparatus is configured to receive an optical signal comprising the second optical communication signal and a reflected portion of the first optical communication signal and the coherent optical demodulation apparatus is configured to perform coherent detection of the received optical signal to obtain a digital signal, and wherein the digital signal processor is additionally configured to:
perform digital filtering on the digital signal to remove a part of the digital signal representing the reflected portion of the first optical communication signal; and
downconvert the filtered digital signal to obtain a real baseband signal.

13. The optical transceiver of claim 9, wherein the baseband signal is a complex baseband signal and the optical transceiver further comprises an optical filter configured to filter the optical carrier signal after modulation with the modulation signal.

14. The optical transceiver of claim 9, wherein the optical signal generation apparatus comprises an optical modulator configured to modulate the optical carrier signal with the modulation signal and configured to operate at a modulation frequency and the baseband signal has a bandwidth that is substantially half the modulation frequency.

15. The optical transceiver of claim 14, wherein the baseband signal has a higher-order modulation format.

16. The optical transceiver of claim 9, wherein the optical transceiver comprises a laser configured to generate an optical signal used to provide both the optical carrier signal and a local oscillator signal of the coherent optical demodulation apparatus.

* * * * *